Sept. 20, 1966   J. M. MASSÓ REMIRO   3,273,167
PROCESS FOR THE MANUFACTURE OF MIXED FABRIC AND LATEX GARMENTS
Filed Jan. 24, 1964   3 Sheets-Sheet 1

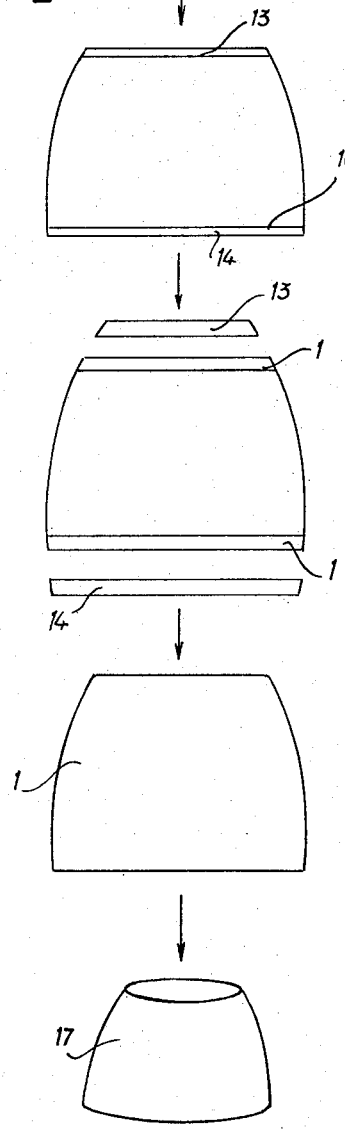
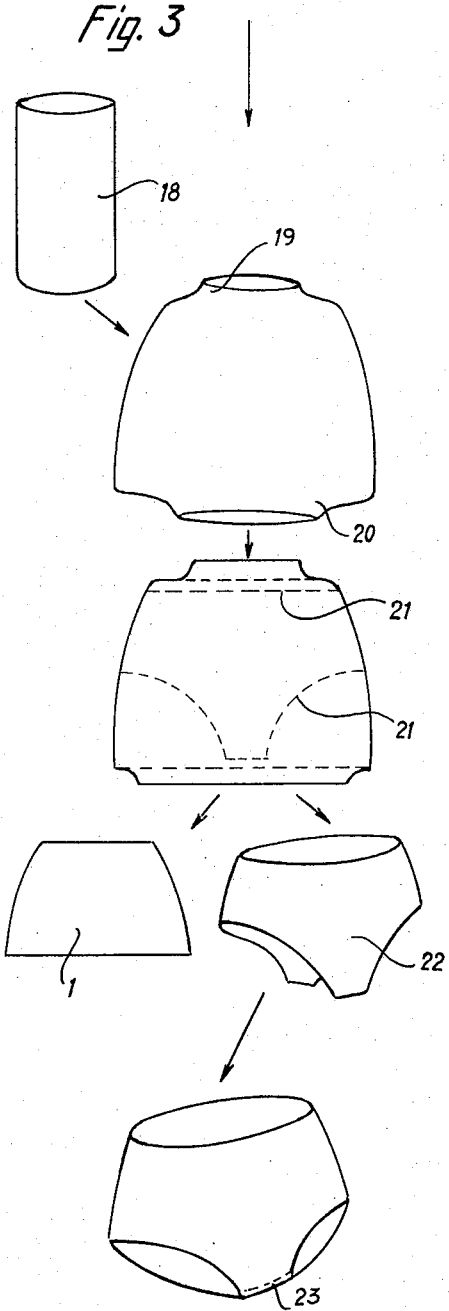

Sept. 20, 1966  J. M. MASSÓ REMIRO  3,273,167
PROCESS FOR THE MANUFACTURE OF MIXED FABRIC AND LATEX GARMENTS
Filed Jan. 24, 1964  3 Sheets-Sheet 3

United States Patent Office 3,273,167
Patented Sept. 20, 1966

3,273,167
PROCESS FOR THE MANUFACTURE OF MIXED FABRIC AND LATEX GARMENTS
Jose Maria Massó Remiro, 3 Consejo de Ciento St., Barcelona, Spain
Filed Jan. 24, 1964, Ser. No. 340,017
Claims priority, application Spain, Feb. 2, 1963, 285,019
2 Claims. (Cl. 2—243)

This invention relates to a process for the manufacture of mixed fabric and latex garments.

The process comprises the steps of providing a flat mold of a material having a lower specific gravity than water, preferably carton wood whose density is 0.6 to the silhouette desired for the garment with the dimensions being somewhat greater than the dimensions of the garment, providing a fabric having elastic characteristics and of tubular form with the transverse dimension thereof being slightly less than the narrowest part of the mold, placing said fabric on said mold, cutting the tubular fabric on the mold thereby leaving an excess of fabric projecting at each end of the mold, closing the ends of the tubular fabric immediately over the ends of the mold, removing the excess of fabric projecting at each end of the mold, moving the fabric covered mold tangentially into a latex bath having a depth not greater than 15 cm., moving the fabric covered mold through the latex bath along a course approximately parallel to the surface of the bath, withdrawing the covered mold tangentially from the bath, drying the latex fabric covered mold under temperature and humidity conditions not exceeding 55° C. and 80% respectively, removing the excess of latex and fabric extending beyond the ends of the mold, imparting to the extremities of the tubular fabric the form of garment desired, and removing the garment from the mold for its final finish by means of trimmings, fasteners, et cetera.

An alternative process comprises the steps of providing a flat mold of a material having a lower specific gravity than water, preferably carton wood whose density is 0.6 to dimensions somewhat greater than the dimensions of the garment, providing a prepared tubular, continuous and elastic fabric with the minimum transverse width thereof being slightly less than the narrowest part of the mold, placing said fabric on said mold, leaving an excess of fabric projecting at each end of the mold, moving the fabric covered mold tangentially into a latex bath having a depth not greater than 15 cm., moving the fabric covered mold through the latex bath along a course approximately parallel to the surface of the bath, withdrawing the covered mold tangentially from the bath, drying the latex fabric covered mold at ambient temperature, providing a second tubular, continuous and elastic fabric having a transverse dimension in a state of rest slightly less than the smallest dimension of the mold, placing said second fabric over the latex fabric covered mold whereby said second fabric adheres to the latex, leaving said fabrics on the mold for complete drying, marking said fabrics for ultimate cutting, cutting said fabrics on the mold, eliminating the cut excess, separating the said fabrics from the mold for final finish, providing additional pieces of similar characteristics, and sewing said pieces together to constitute a garment.

In order to pass the molds through the bath, a chain is provided and is fitted with conveniently spaced hooks on which the molds are suspended, so that during the movement of the chain the hooks are submerged sufficiently to submerge the molds in the bath in an approximately horizontal position and at a depth not exceeding 15 cm.

By following this manner of realization it is possible to obtain women's corsets, orthopaedic garments, underwater garments, swim-suits and sports attire especially for aquatic skiing.

In the drawing:

FIGURE 2 is a similar view showing the second phase according to one embodiment.

FIGURE 3 is a similar view showing the second phase according to a second embodiment.

Figure 1:
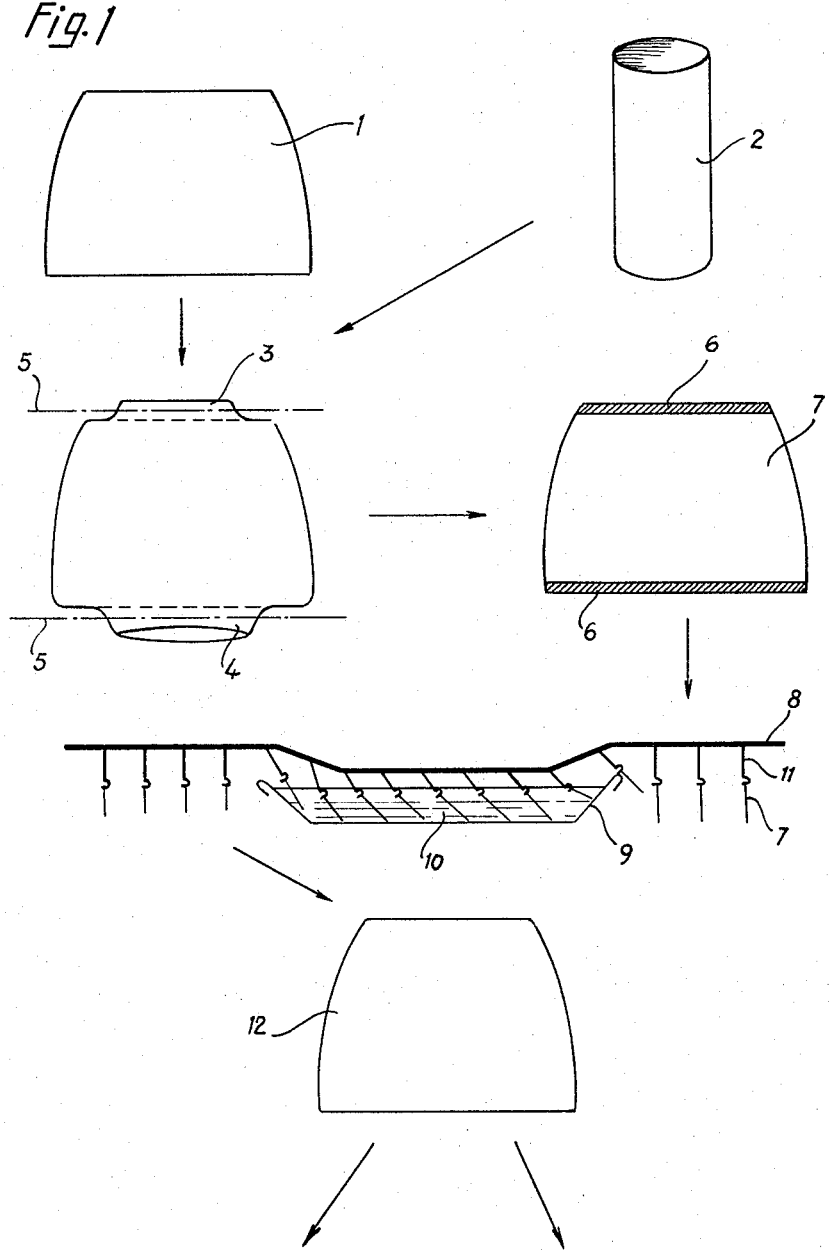
FIGURE 1 is a diagrammatic view showing the first manufacturing stage.

Regardless of the nature of the garment to be made, the manufacture thereof is initiated by the preparation of a stamped mold 1 and of an elastic tubular fabric 2 having a transverse dimension slightly less than that of the minimum transverse dimension of the mold, and slightly longer than this latter dimension.

In the second phase of manufacture the mold 1 is introduced into the fabric tube 2 and whose extremities 3 and 4 project a certain distance, with the excessive projections being eliminated by cutting along lines 5. These open extremities of the fabric are then sewn as at 6 thus leaving an inseparable mold-fabric assembly 7.

The assemblies 7 of the last mentioned phase are then suspended on a chain 8 adapted to have horizontal displacement imparted thereto and with a slight descending movement passing over a bath 9 containing latex 10 so that the assemblies 7 suspended from hooks 11 are submerged by partial immersion of the hooks in the bath.

Upon leaving the bath, assembly 12 has been formed and comprises mold-fabric-latex, which assembly may follow two finishing processes shown in FIGURES 2 and 3 respectively.

According to the process shown in FIGURE 2, the latex is allowed to dry and then extremities 13 and 14 of the layers of fabric and latex are cut off following the lines shown respectively at 15 and 16 thus separating the extremities 13 and 14, with the extremities of the mold 1 being then exposed. Garment 17 is then separated from the mold 1, and the garment requires only the application of the trimmings and the attachment of the accessories, etc.

According to the process shown in FIGURE 3, a second tubular fabric 18 is added over the assembly 12 while the latter is still moist, with the tube 18 being slightly longer than the mold and slightly narrower than the minimum width of the mold, so that extremities 19 and 20 of the tube 18 assume the form as shown. The assembly, namely, the mold-fabric-latex-fabric is then allowed to dry immediately, and when dry the assembly is cut to remove the excess of fabric-latex-fabric without touching the mold, as shown by the lines 21, thus producing garment 22 which can be separated from the mold 1, and finished by lines of stitching 23 and the formation of the corresponding doublings.

According to this method, immersion suits may similarly be obtained, constituted by an upper piece for the torso and arms, and a lower piece for the legs which will cover the entire human body excluding the face. This class of garment is made by joining several pieces produced by this process and specially following the steps given in regard to FIGURE 2.

Figure 4:
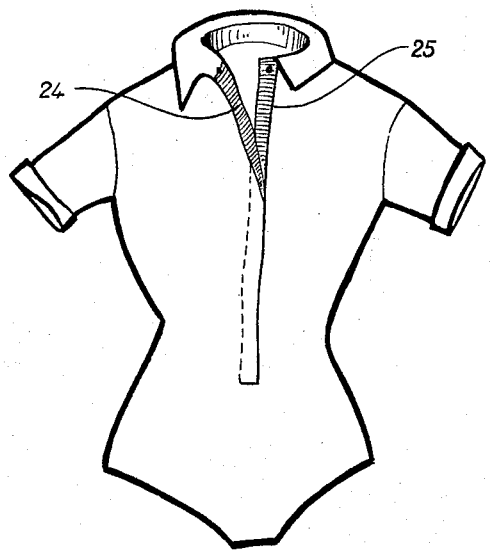
FIGURE 4 is an elevational view of a nautical ski garment produced according to the process.

Sports garments may also be produced, especially for aquatic skiing as will be seen from FIGURE 4 by following the procedure set forth in connection with FIGURE 3 by uniting several pieces along lines of stitches or by similar methods.

This last garment may be finished by the inclusion of hook type fasteners comprising for example two overlapping strips 24 and 25, with one strip having hooks and the other eyes.

In accordance with this process it is possible also to prepare the outer tube from a flat fabric previously punched to shape and then closed by sewing so that the finished garment presents but one longitudinal seam located in an obscure zone such as at the right beneath the arm thus offering perfect continuity of the stamping and improving the outward apperance of the garment.

What I claim is:

1. A process for making garments of fabric and latex, comprising the steps of providing a flat mold of a material having a lower specific gravity than water, preferably carton wood whose density is 0.6 to the sillouette desired for the garment with the dimensions being somewhat greater than the dimensions of the garment, providing a fabric having elastic characteristics and of tubular form with the transverse dimension thereof being slightly less than the narrowest part of the mold, placing said fabric on said mold cutting the tubular fabric on the mold thereby leaving an excess of fabric projecting at each end of the mold, closing the ends of the tubular fabric immediately over the ends of the mold, removing the excess of fabric projecting at each end of the mold, moving the fabric covered mold tangentially into a latex bath having a depth not greater than 15 cm., moving the fabric covered mold through the latex bath along a course approximately parallel to the surface of the bath, withdrawing the covered mold tangentially from the bath, drying the latex fabric covered mold under temperature and humidity conditions not exceeding 55° C. and 80% respectively, removing the excess of latex and fabric extending beyond the ends of the mold, imparting to the extremities of the tubular fabric the form of garment desired, and removing the garment from the mold for its final finish.

2. A process for making garments of fabric and latex, comprising the steps of providing a flat mold of a material having a lower specific gravity than water, preferably carton wood whose density is 0.6 to dimensions somewhat greater than the dimensions of the garment, providing a tubular, continuous and elastic fabric with the minimum transverse width thereof being slightly less than the narrowest part of the mold, placing said fabric on said mold, leaving an excess of fabric projecting at each end of the mold, moving the fabric covered mold tangentially into a latex bath having a depth not greater than 15 cm., moving the fabric covered mold through the latex bath along a course approximately parallel to the surface of the bath, withdrawing the covered mold tangentially from the bath, drying the latex fabric covered mold at ambient temperature, providing a second tubular, continuous and elastic fabric having a transverse dimension in a state of rest slightly less than the smallest dimension of the mold, placing said second fabric over the latex fabric covered mold whereby said second fabric adheres to the latex, leaving said fabrics on the mold for complete drying, marking said fabrics for ultimate cutting, cutting said fabrics on the mold, eliminating the cut excess, separating said fabrics from the mold for final finish, providing additional pieces of similar characteristics, and sewing said pieces together to constitute a garment.

References Cited by the Examiner
UNITED STATES PATENTS

| | | | |
|---|---|---|---|
| 687,077 | 11/1901 | Sprang | 2—82 |
| 1,605,445 | 11/1926 | Killian | 18—2 |
| 2,077,514 | 4/1937 | Callahan. | |
| 2,183,380 | 12/1939 | Hurt | 2—67 |
| 2,712,161 | 7/1955 | Moss | 264—303 |
| 2,753,593 | 7/1956 | Duff | 18—2 |
| 2,981,954 | 5/1961 | Garbellano | 2—67 X |
| 3,005,237 | 10/1961 | Anderson | 264—303 |
| 3,136,832 | 6/1964 | Ballmer | 264—306 X |

JORDAN FRANKLIN, *Primary Examiner.*

ROBERT F. WHITE, *Examiner.*

R. B. MOFFITT, A. R. GUEST, *Assistant Examiners.*